April 20, 1943.    H. M. DODGE    2,316,941
OIL SEAL
Filed April 19, 1941    2 Sheets-Sheet 1
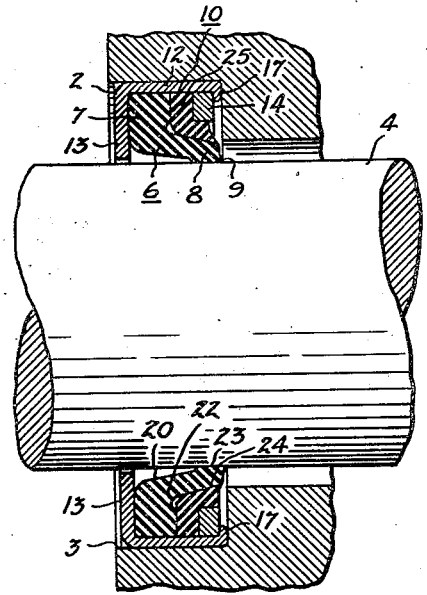
Fig. 1
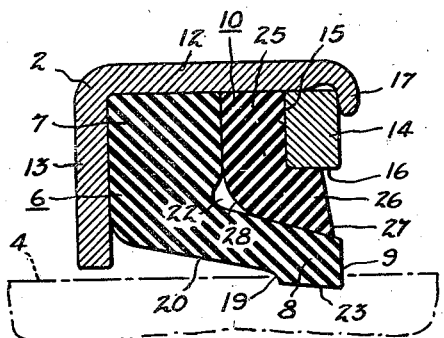
Fig. 2
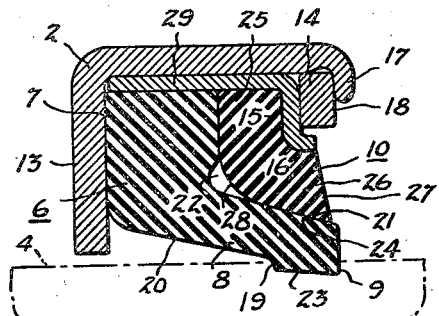
Fig. 3
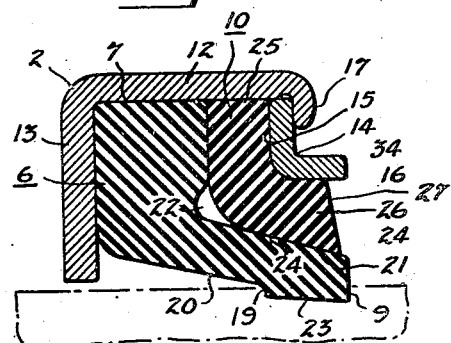
Fig. 4
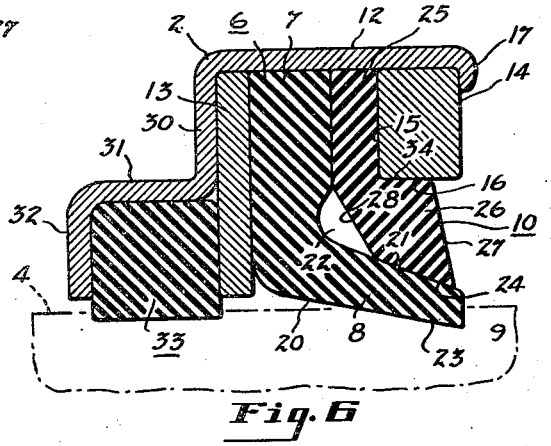
Fig. 6
Fig. 5
INVENTOR
*Howard M. Dodge*
BY *Evans + McCoy*
ATTORNEYS April 20, 1943.                 H. M. DODGE                   2,316,941
                                  OIL SEAL
                         Filed April 19, 1941        2 Sheets-Sheet 2

INVENTOR
*Howard M. Dodge*
BY
ATTORNEYS

Patented Apr. 20, 1943

2,316,941

UNITED STATES PATENT OFFICE 2,316,941

OIL SEAL

Howard M. Dodge, Wabash, Ind., assignor to The General Tire & Rubber Company, Akron, Ohio, a corporation of Ohio Application April 19, 1941, Serial No. 389,391

9 Claims. (Cl. 288—3)

This invention relates to improvements in machinery packing and particularly to oil or grease seals of the self-contained type.

The grease seals heretofore proposed have usually contained one or more metallic spring members which press against sealing members of leather, rubber, or the like. While such oil seals when properly assembled have usually been effective, it has often been difficult to properly center the component parts of the seal so that uniform pressure was obtained over the entire sealing edges.

Oil and grease seals which do not contain metallic springs have many inherent advantages over seals in which the metallic springs press against the sealing member. Oil seals heretofore proposed, using relatively resilient rubber as a spring to press against the sealing member, have not, however, been entirely satisfactory. In one type where a relatively heavy ring of resilient rubber is prevented from increasing in circumference by a close fitting casing, it is exceedingly difficult to obtain the desired concentration of pressure at the sealing edge or lip of the seal. This is apparently because a block of rubber has substantially greater compressive strength at its midportion than adjacent its edges. Another type, wherein the pressure is applied by a small band of rubber floating on the edge of the lip of the seal, is often not desirable because there is a substantial tendency for the diameter of the small band to increase in size due to the swelling of the rubber in use, and with the stiff stocks the sealing pressure may be insufficient.

It is an object of the present invention to provide an oil seal utilizing a relatively resilient rubberlike material as a pressure member, and having the pressure strongly concentrated adjacent the sealing tip.

It is another object of the present invention to provide an oil seal that is relatively easy to assemble with its component parts in correct alignment.

It is a further object of the present invention to provide an oil seal wherein the pressure is concentrated adjacent the tip of the sealing member, and in which the swelling of the rubber will account for effects due to wearing of the sealing member by the shaft.

It is a still further object to provide oil seals having extremely long wearing properties and which are relatively easy to manufacture and of comparatively low cost.

Other objects will be apparent from the following detailed description of the invention as illustrated by the accompanying drawings, in which:

Figure 1 is a vertical, sectional view, taken through an oil seal in a housing, showing the usual manner of use;

Fig. 2 is an enlarged, sectional view of the seal of Fig. 1 showing the arrangement of the parts when the seal is not deformed by the shaft;

Fig. 3 is a vertical, sectional view of a portion of a slightly modified form of seal in which the casing is formed entirely of sheet metal;

Fig. 4 is a vertical, sectional view of a portion of a slightly modified form of seal;

Fig. 5 is an enlarged, vertical, sectional view, taken through a portion of still another modified form of seal in which the restraining action and concentration of pressure is obtained almost solely by a rubber-to-metal adhesion on the metal restraining member;

Fig. 6 is a vertical, sectional view taken through a portion of a combination oil seal and dust seal;

Figure 7:
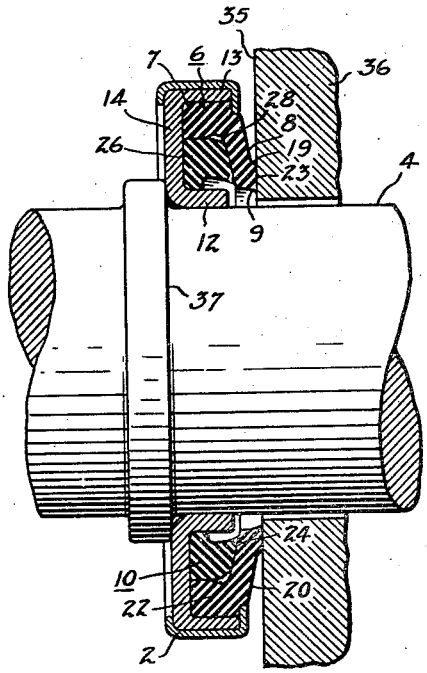
Fig. 7 is a vertical, sectional view of another modified form of my invention showing the seal fixedly held on a rotatable machine element.

The objects of the present invention are accomplished, a loss of tension due to an increase in diameter of the rubber pressure member by swelling is prevented, and a concentration of pressure near the edge of the sealing lip of the seal where such concentration is most effective is obtained, by restraining the movement of a resilient, molded spring or pressure member either by rubber-to-metal adhesion to a rigid restraining member preferably of metal or by clamping it firmly to such restraining member, so that the force due to compression in the outer face of the molded spring or pressure member is reinforced by tension in another portion of this member.

Referring more particularly to the drawings, in which like parts are designated by the same numerals of reference throughout the several views, my improved seals have an annular substantially U-shaped and preferably inwardly opening metal casing 2, which is adapted to be positioned, for example, by a pressed fit on one of the relatively movable machine elements, such as a cylindrical housing 3, about a centrally arranged shaft 4. A centrally apertured angle-shaped molded packing ring 6, which has a substantially annular flange portion 7 which is preferably radial, and an annular extending or lip portion 8 which preferably extends in an axial direction and which is adapted to press against the shaft 4 and with its free edge 9 extending in the direction from which oil flow is to be intercepted, is positioned as shown substantially within the casing 2. A molded and restrained pressure ring 10 of soft, oil-resistant rubberlike material having the physical characteristics of soft, vulcanized rubber and adapted to press the sealing surface of the lip portion adjacent the edge 9 against the other relatively movable machine element or the shaft 4, serves as the spring member and is also positioned substantially within the casing 2.

The casing 2 is preferably of sheet metal and has an annular cylindrical portion 12, which usually has an outer diameter such that it may be fixedly held in oil-tight relation within the housing 3, an annular backing portion or member 13 which is preferably radial and against which the portion 7 of the packing ring may bear, and an annular restraining member 14 which is preferably inwardly extending with a substantially radial portion 15 and an axially extending portion or member 16 against which the centrally apertured molded pressure ring 10 may be compressed and restrained to function, as hereinafter explained. The backing portion 13 and the restraining member 14 may be formed from separate pieces of metal and means, such as inturned or crimped edge 17 of the cylindrical portion, with or without a clamping washer 18, may be provided for permanently holding said restraining member in spaced relation with said radial backing portion so as to form the metal casing 2.

The packing ring 6 is molded from a rubberlike material or synthetic rubber compound containing finely divided carbon, preferably with some graphite, and having a high degree of oil-resistance and abrasion-resistance. The cured molded ring preferably has a hardness of at least 60 on the durometer type-A scale; a hardness or stiffness of between 65 and 80 is found to be preferable.

The extending portion 8 is preferably of frusto-conical shape, with both inner surface 20 and outer surface 21 of frusto-conical shape, and inclined toward the shaft from adjacent the annular flange portion 7. An inclination of the outer surface 21 is particularly desirable and important as it facilitates the attainment of the optimum sealing pressure at the tip adjacent the edge 9 by the restrained pressure ring 10 when the seal is applied to a shaft.

The annular portion 7 of the ring 6 has portions removed or is formed so as to provide an annular groove 22 in the flange adjacent its juncture with the outer conical surface 21 of the extending portion 8. The groove 22 is especially important, both in increasing flexibility of the extending portion when it is composed of relatively hard material and in decreasing the area of the flange in contact with the pressure ring 10, so that action of the latter is unimpeded. The groove 22 also provides increased volume to receive the relatively soft rubber of the pressure ring 10 in cases when the latter is unduly deformed.

The inner conical surface 20 of the sealing ring 6 is preferably provided with an annular shoulder 19 near the edge 9 to form a sealing surface 23, which is less conical than the surface 20. The sealing surface 23 is preferably so designed in relation to the shaft that it will be frusto-conical in the free state and yet will be substantially cylindrical when in contact with the shaft so that the pressure on the shaft adjacent the sealing edge 9 therefore tends to be greatest.

The pressure ring 10 is preferably of softer, oil-resistant synthetic rubber than that of the packing ring 6, and for best results should preferably have a hardness of less than about 50 durometer "A" scale. It is contained within the annular space formed by the re-entrant angle between the extending portion 7 and the annular flange portion 8 of the sealing ring 6. The pressure member 10 has a surface 24 which is preferably also frusto-conical, being substantially complemental to the surface 21 and the pressure member is adapted to exert a pressure against the outer conical surface 21 to increase the pressure of the sealing surface 23 against the member, such as the shaft 4 which is movable relative thereto.

According to the present invention, although a slight inward-outward movement of the pressure member relative to the surface 21 may be permitted, means is provided for restraining such movement of the pressure member during compression, so that maximum sealing pressure is always exerted on the shaft near the edge 9. When, as in my preferred form, illustrated by Figs. 1 to 4 and 6, the pressure member 10 is provided with a radial flange portion 25 as well as an axially extending portion 26, I may accomplish the restraint of the outward movement of the outer face 27 entirely by compressing and clamping the flange portion 25 between the radial annular portion 7 and the restraining member 14. When, as in the modification of my invention, illustrated by Figs. 5, 7 and 8, the pressure member has no flange portion but only an axially extending portion 26, the pressure ring 10 is restrained substantially entirely by molding and firmly adhering it to the rigid restraining member 14 by rubber-to-metal adhesion. Even when the pressure member 10 has a radial flange portion, however, it is preferably molded to and adhered by a suitable rubber-to-metal adhesive to the metal restraining member 14, as such composite formation has been found to facilitate assembly, to insure concentricity of the parts so that more uniform pressure over the sealing surface is obtained, and to improve the concentration of pressure at the desired points.

When the packing ring 6 is to be fixedly held in a housing with the sealing surface 23 bearing against the shaft, it is molded so that the opening or aperture adjacent the edge 9 is of somewhat smaller diameter than the shaft. The pressure member 10 is preferably molded so that the outer surface 21 of the packing ring and the inner frusto-conical surface 24 are in contact when both the packing ring 6 and the pressure member 10 are in their molded or unstrained positions. When the seal is applied over the shaft, the packing member 6 is deformed so that this aperture adjacent the surface 9 is extended to slightly larger than its molded diameter. Such deformation causes compression of the axially extending portion 26 against its attached surface 34 and against the axially extending portion 16 of the restraining member 14 of the casing 2. During compression, there is also a tendency for the portion 26 adjacent the outer surface 27 to move outwardly, so that the pressure on the sealing surface 23 adjacent the surface 9 is reduced. When, however, the pressure member 10 is attached to the restraining member 14, either by adhesion or compression of the flange 25, that outward movement during compression is prevented by tension in the region of the chamfer corner 28 connecting the inner surface 24 with a surface of said radial flange portion. A sort of "heel-and-toe" action is thereby obtained to increase the pressure on the surface 23 adjacent the point 9.

In the type of seals having an inwardly or outwardly opening U-shaped casing, to facilitate the regulation of pressure on the flange 25 of the pressure member and on the radial annular portion of the packing ring, it is preferable that a suitable spacer 29 be provided between the annular radial backing portion 13 and the annular restraining member 14 of the casing 2. The spacing member 29 may be annular and integral with the restraining member, as illustrated in Fig. 3, or integral with the annular radial backing portion 13 of the casing, as illustrated in Fig. 5, or it may be a separate member if desired.

Fig. 6 illustrates a slightly modified form of my invention having a dust seal in combination with a fluid seal. As shown therein, the casing 2 is provided with an offset portion comprising a cylindrical portion 31 of smaller diameter than the diameter of the cylindrical portion 12 and an inwardly extending radial flange portion 32. The annular radial backing portion 13 of the casing bears against a shoulder portion 30, which formed integrally with the annular cylindrical portion 12 and which is between said offset and said cylindrical portions.

The dust sealing member 33, made of rubber, synthetic rubber, felt, or the like, is contained within the cavity of the offset portion and presses against the shaft 4 to prevent dust, grit and the like from contacting the sealing edge 33.

Figure 8:
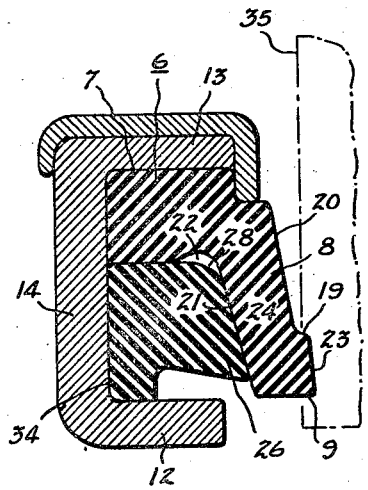
Fig. 8 is an enlarged, detail sectional view of the seal of Fig. 7.

In the modification of Figs. 7 and 8, the casing 2 and the seal is fixedly held on the shaft 4 by a force fit, and the shoulder 37. In the modification the backing portion 13 of the U-shaped casing 2 is axially extending, and the restraining member 14 is radial. The flange 7 of the sealing ring, instead of being radial as in my preferred form, is axially extending, and the surface 23 bears against a flat vertical surface 35 of the stationary machine element 36. The operation of the sealing element, however, is substantially identical.

It has been found that the restriction of the pressure member within the casing in addition to improving the pressure characteristics adjacent the sealing tip, as above described, causes the pressure on the sealing surface to be increased rather than decreased by the slight swelling which usually occurs within the pressure member due to petroleum products or other fluids being absorbed therein. Since the area in contact with the solvent is relatively small, such swelling takes place very gradually, and under usual conditions it is just about sufficient to compensate for the wear at the sealing surface.

Any of the oil-resistant synthetic rubbers, such as for example polychloroprene, and the co-polymers of butadiene with acrylic nitrile, styrene, vinyl chloride and certain other resin-forming materials, may be suitably compounded and used for forming the molded elements of the present invention. It is intended that the term "rubberlike material" includes such synthetic rubbers, as well as natural rubber.

While I have shown oil seals having an inwardly opening metal casing, which casing is to be fixedly held within a housing member, it is obvious that the casing may be outwardly opening and be adapted to be fixedly mounted on the movable shaft with the sealing surface 23 in contact with a cylindrical surface of the stationary member without changing the spirit of the invention.

It is also apparent that numerous modifications of the invention may be made without changing the spirit thereof, and it is intended that it be limited only by the appended claims.

What I claim is:

1. An oil retaining device to seal a space between a housing and a shaft, comprising an inwardly opening annular metal casing adapted to be fixedly held in oil-tight contact within said housing, said casing having a cylindrical portion adapted to contact the housing, an annular radial backing portion, an inwardly extending annular restraining member having a substantially radial portion and an axially extending portion, means for holding said restraining member in spaced relation with said radial backing portion, a centrally apertured molded packing ring of oil-resistant rubberlike material having a substantially radial annular portion disposed within said casing and bearing against said backing portion of said casing, an axially extending frusto-conical portion integral with said radial annular portion, a molded pressure ring of a flexible oil-resistant synthetic rubber compound disposed in the re-entrant angle between said axially extending portion and said radial portion of said packing ring and having a portion which bears against both said inwardly extending annular restraining member of said casing and said radial annular portion of said packing ring and a portion which bears against the outer surface of said axially extending frusto-conical portion of said packing ring, said axially extending portion of said centrally apertured packing ring being inclined from adjacent said annular radial portion toward the shaft and having adjacent its free end a sealing surface adapted to contact the shaft, said pressure ring having an axially extending portion molded on and strongly attached to said axially extending portion of said inwardly extending annular restraining member of said casing, whereby outward movement of said pressure ring on said inclined inner surface is restrained by said annular restraining member.

2. An oil retaining device to seal a space between a housing and a shaft, comprising an inwardly opening annular metal casing adapted to be fixedly held in oil-tight contact within said housing, said casing having a cylindrical portion adapted to contact the housing, an annular radial backing portion, an inwardly extending annular restraining member having a substantially radial portion and an axially extending portion, means for holding said restraining member in spaced relation with said radial backing portion, a centrally apertured molded packing ring of oil-resistant rubberlike material having a substantially radial annular portion disposed within said casing and bearing against said backing portion of said casing, an axially extending frusto-conical portion integral with said radial annular portion, a molded pressure ring of a flexible oil-resistant synthetic rubber compound disposed in the re-entrant angle between said axially extending portion and said radial portion of said packing ring and having a portion which bears against both said inwardly extending annular restraining member of said casing and said radial annular portion of said packing ring and a portion which bears against the outer surface of said axially extending frusto-conical portion of said packing ring, said axially extending portion of said centrally apertured packing ring being inclined from adjacent said annular radial portion toward the shaft and having adjacent its free end an annular shoulder forming a relatively flat annular sealing surface adapted to contact the shaft, said pressure ring having an axially extending portion molded on and strongly attached to said axially extending portion of said inwardly extending annular restraining member of said casing, whereby movement of said pressure ring is restrained by said annular restraining member.

3. An oil retaining device to seal a space between a housing and a shaft, comprising an inwardly opening annular metal casing adapted to be fixedly held in oil-tight contact within said housing, said casing having a cylindrical portion adapted to contact the housing, an annular radial backing portion, an inwardly extending annular restraining member having a substantially radial portion and an axially extending portion, means for holding said restraining member in spaced relation with said radial backing portion, a centrally apertured molded packing ring of relatively hard flexible oil-resistant rubberlike compound having a hardness of at least 60 durometer "A" scale and having a substantially radial annular portion disposed within said casing and bearing against said backing portion of said casing, an integral axially extending frusto-conical portion and an annular groove in said radial annular portion adjacent the juncture of the outer surface of said frusto-conical portion with said radial annular portion, a molded pressure ring of a flexible oil-resistant synthetic rubber compound disposed in the re-entrant angle between said axially extending portion and said radial portion of said packing ring and having a portion which bears against both said inwardly extending annular restraining member of said casing and said radial annular portion of said packing ring and a portion which bears against the outer surface of said axially extending frusto-conical portion of said packing ring, said axially extending portion of said centrally apertured packing ring being inclined from adjacent said annular radial portion toward the shaft and having adjacent its free end a sealing surface adapted to contact the shaft, said pressure ring having an axially extending portion molded on and strongly attached to said axially extending portion of said inwardly extending annular restraining member of said casing, whereby movement of said pressure ring is restrained by said annular restraining member.

4. An oil retaining device to seal a space between a housing and a shaft, comprising an inwardly opening annular metal casing adapted to be fixedly held in oil-tight contact within said housing, said casing having a cylindrical portion adapted to contact the housing, an annular radial backing portion, an inwardly extending annular restraining member having a substantially radial portion and an axially extending portion, means for holding said restraining member in spaced relation with said radial backing portion, a centrally apertured molded packing ring of relatively hard flexible oil-resistant rubberlike compound having a substantially radial annular portion disposed within said casing and bearing against said backing portion of said casing, an integral axially extending frusto-conical portion and an annular groove in said radial annular portion adjacent the juncture of the outer surface of said frusto-conical portion with said radial annular portion, a molded pressure ring of a flexible oil-resistant synthetic rubber compound disposed in the re-entrant angle between said axially extending portion and said radial portion of said packing ring and having a portion which bears against both said inwardly extending annular restraining member of said casing and said radial annular portion of said packing ring and a portion which bears against the outer surface of said axially extending frusto-conical portion of said packing ring, said axially extending portion of said centrally apertured packing ring being inclined from adjacent said annular radial portion toward the shaft and having adjacent its free end a sealing surface adapted to contact the shaft, said pressure ring having an axially extending portion molded on and strongly attached to said axially extending portion of said inwardly extending annular restraining member of said casing, whereby movement of said pressure ring is restrained by said annular restraining member.

5. An oil retaining device to seal a space between a housing and a shaft, comprising an inwardly opening annular metal casing adapted to be fixedly held in oil-tight contact within said housing, said casing having a cylindrical portion adapted to contact the housing, an annular radial backing portion, an inwardly extending annular restraining member having a substantially radial portion and an axially extending portion, an annular spacer between said radial annular backing portion and said inwardly extending restraining member and means for securing said restraining member to said backing portion and cylindrical portion, a centrally apertured molded packing ring of oil-resistant rubberlike material having a substantially radial annular portion disposed within said casing and bearing against said backing portion of said casing, an axially extending frusto-conical portion integral with said radial annular portion, a molded pressure ring of a flexible oil-resistant synthetic rubber compound disposed in the re-entrant angle between said axially extending portion and said radial portion of said packing ring and having a portion which bears against both said inwardly extending annular restraining member of said casing and the outer surface of said axially extending frusto-conical portion of said packing ring and a portion which bears against said radial annular portion of said packing ring, the inner surface of said axially extending portion of said centrally apertured packing ring being inclined from adjacent said annular radial portion toward the shaft and having adjacent its free end a sealing surface adapted to contact the shaft, said pressure ring having an axially extending portion molded on and strongly attached to said axially extending portion of said inwardly extending annular restraining member of said casing, whereby movement of said pressure ring is restrained by said annular restraining member.

6. An oil retaining device to seal a space between a housing and a shaft, comprising an inwardly opening annular metal casing adapted to be fixedly held in oil-tight contact within said housing, said casing having a cylindrical portion adapted to contact the housing, an annular radial backing portion, an inwardly extending annular restraining member having a substantially radial portion and an axially extending portion and means for holding said restraining member in spaced relation with said radial backing portion, a centrally apertured molded packing ring of oil-resistant rubberlike material having a substantially radial annular portion disposed within said casing and bearing against said backing portion of said casing, an axially extending frusto-conical portion integral with said radial annular portion, a molded pressure ring of a flexible oil-resistant synthetic rubber compound molded and adhesively attached to said restraining member, bearing against said radial annular portion of said packing member, and disposed in the re-entrant angle between said axially extending portion and said radial portion of said packing ring and having portions which bear against both said inwardly extending annular restraining member of said casing and the outer surface of said axially extending frusto-conical portion of said packing ring, said packing ring having adjacent its free end a sealing surface adapted to contact the shaft.

7. An oil retaining device to seal a space between a housing and a shaft, comprising an inwardly opening annular metal casing adapted to be fixedly held in oil-tight contact within said housing, said casing having a cylindrical portion adapted to contact the housing, an annular radial backing portion, an inwardly extending annular restraining member having a substantially radial portion and an axially extending portion, means for holding said restraining member in spaced relation with said radial backing portion, a centrally apertured molded packing ring of relatively hard flexible oil-resistant rubberlike compound having a hardness of at least 60 durometer "A" scale and having a substantially radial annular portion disposed within said casing and bearing against said backing portion of said casing, an integral axially extending frusto-conical portion and an annular groove in said radial annular portion adjacent the juncture of the outer surface of said frusto-conical portion with said radial annular portion, a molded pressure ring of a softer synthetic rubber compound than said packing ring disposed in the re-entrant angle between said axially extending portion and said radial portion of said packing ring and having a radial flange portion and an axially extending portion with an inner frusto-conical surface and a chamfered corner connecting said inner surface with a surface of said flange portion of said pressure member, said inner frusto-conical surface being adapted to press against the outer frusto-conical surface of said packing ring and the outer surface of said axially extending portion of said pressure member being adapted to press against said restraining member of said casing, the inner surface of said axially extending portion of said centrally apertured packing ring being inclined from adjacent said annular radial portion toward the shaft and having adjacent its free end a sealing surface adapted to contact the shaft, said pressure ring having an axially extending portion molded on and strongly attached to said axially extending portion of said inwardly extending annular restraining member of said casing, whereby movement of said pressure ring is restrained by said annular restraining member.

8. A combination dust and oil seal for sealing space between a housing and a shaft, comprising an inwardly opening annular metal casing adapted to be fixedly held in oil-tight contact with said housing, said casing having a cylindrical portion adapted to contact the housing, an offset portion of smaller diameter than the diameter of said cylindrical portion, an annular radial backing portion bearing against the shoulder between said offset portion and said cylindrical portion, an inwardly extending annular restraining member and means for holding said restraining member in spaced relation with said radial backing portion and said offset portion, said offset portion having an inwardly extending radial flange and containing a dust sealing member adapted to press against the shaft, a centrally apertured molded packing ring of oil-resistant rubberlike material having a substantially radial annular portion disposed within said casing and bearing against said backing portion of said casing, an axially extending frusto-conical portion integral with said radial annular portion, a molded pressure ring of a flexible oil-resistant synthetic rubber compound disposed in the re-entrant angle between said axially extending portion and said radial portion of said packing ring and having portions which bear against both said inwardly extending annular restraining member of said casing and the outer surface of said axially extending frusto-conical portion of said packing ring, the inner surface of said axially extending portion of said centrally apertured packing ring being inclined from adjacent said annular radial portion toward the shaft and having adjacent its free end a sealing surface adapted to contact the shaft, said pressure ring having an axially extending portion molded on and strongly attached to said axially extending portion of said inwardly extending annular restraining member of said casing, whereby movement of said pressure ring is restrained by said annular restraining member.

9. An oil retaining device to seal a space between a pair of relatively movable machine elements, comprising an annular metal casing having a cylindrical portion adapted to be fixedly held in oil-tight contact with one of said machine elements, an annular radial backing portion and an inwardly extending annular restraining member which has a substantially radial portion and an axially extending portion, a centrally apertured molded packing ring of oil-resistant rubberlike material and having a substantially radial annular portion disposed within said casing and bearing against said backing portion of said casing and an axially extending portion integral with said radial annular portion, a molded pressure ring of softer rubberlike material than said packing ring disposed in the re-entrant angle between said axially extending portion and said radial portion of said packing ring and having a portion which bears against said inwardly extending annular restraining member of said casing and said radial annular portion of said packing ring, the inner surface of said axially extending portion of said packing ring being inclined from adjacent the annular radial portion toward the other relatively movable machine element and being adapted to contact this machine element adjacent its free end, said pressure ring having an axially extending portion which bears against said axially extending portion of said inwardly extending annular restraining member of said casing, whereby by compression between said axially extending portion of said packing ring and said annular restraining member of said casing the sealing surface of said pressure ring is forced into intimate contact with the machine element movable relative thereto.

HOWARD M. DODGE.